US006934777B2

(12) United States Patent
Kawamura et al.

(10) Patent No.: US 6,934,777 B2
(45) Date of Patent: Aug. 23, 2005

(54) TERMINAL DEVICE, APPARATUS AND METHOD FOR CONTROLLING A TERMINAL DEVICE, AND METHOD OF CONTROLLING A PROCESS IN A TERMINAL DEVICE

(75) Inventors: Hirofumi Kawamura, Kanagawa (JP); Yoji Kawamoto, Tokyo (JP); Motomasa Futagami, Kanagawa (JP); Motohiko Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 09/759,477

(22) Filed: Jan. 12, 2001

(65) Prior Publication Data

US 2001/0024164 A1 Sep. 27, 2001

(30) Foreign Application Priority Data

Jan. 20, 2000 (JP) .................................... 2000-014238

(51) Int. Cl.⁷ ............................................. G06F 13/00
(52) U.S. Cl. ........................ 710/62; 710/72; 709/208; 709/232; 700/23; 348/21; 348/14.05
(58) Field of Search ............................. 700/23, 82, 83, 700/96, 197, 208; 710/62–65, 72–74, 33–36; 709/201–203, 223–228, 230–232; 340/825.37; 348/14.01–14.05, 21

(56) References Cited

U.S. PATENT DOCUMENTS

| | | | | |
|---|---|---|---|---|
| 5,313,386 A | * | 5/1994 | Cook et al. | .................... 700/82 |
| 5,426,421 A | * | 6/1995 | Gray | .......................... 709/223 |
| 5,721,583 A | * | 2/1998 | Harada et al. | .................. 725/24 |
| 5,774,355 A | * | 6/1998 | Mizuno et al. | ................ 700/23 |
| 5,805,812 A | * | 9/1998 | Fish et al. | ................... 709/208 |
| 5,828,840 A | * | 10/1998 | Cowan et al. | ............... 709/203 |
| 6,100,812 A | * | 8/2000 | Tanaka et al. | ......... 340/825.37 |
| 6,211,870 B1 | * | 4/2001 | Foster | ......................... 345/744 |
| 6,311,101 B1 | * | 10/2001 | Kastner | ....................... 700/197 |
| 6,453,210 B1 | * | 9/2002 | Belotserkovskiy et al. | ... 700/96 |
| 6,457,040 B1 | * | 9/2002 | Mizuhara et al. | ........... 709/201 |
| 6,484,061 B2 | * | 11/2002 | Papadopoulos et al. | ........ 700/83 |

FOREIGN PATENT DOCUMENTS

| | | |
|---|---|---|
| EP | 0 812 091 | 12/1997 |
| EP | 0 930 758 | 7/1999 |
| WO | WO 98/06207 | 2/1998 |

OTHER PUBLICATIONS

S–M. Kang, et al., Enterprise Networking Mini–Conference, XP–010229415, pp. 14–20, "A Study on a Common Service–Providing Architecture for Future Telecommunications", Jun. 11, 1997.

* cited by examiner

*Primary Examiner*—Christopher B. Shin
(74) *Attorney, Agent, or Firm*—Oblon, Spivak, McClelland, Maier & Neustadt, P.C.

(57) ABSTRACT

A terminal control apparatus 1 for causing various terminal devices to perform appropriate operations. The terminal control apparatus comprises a communication section 11, a control section 12, and a data-storing section 13. The communication section 11 accomplishes communication with a terminal device 2. The control section 12 controls the terminal device 2. The terminal device 3 comprises a communication section 21, a control section 22, and a terminal section 23. The communication section 21 achieves communication with the terminal control apparatus 1. The control section 22 transmits terminal information to the terminal control apparatus 1. The terminal information represents the type and capacity of the terminal device 2. The terminal control apparatus 1 performs terminal control functions in accordance with the terminal information. The control section 22 controls the terminal section 23 in accordance with the terminal control functions the apparatus 1 has performed. Thus controlled, the terminal section 23 carries out prescribed terminal functions.

16 Claims, 12 Drawing Sheets

TERMINAL DEVICE, APPARATUS AND METHOD FOR CONTROLLING A TERMINAL DEVICE, AND METHOD OF CONTROLLING A PROCESS IN A TERMINAL DEVICE

BACKGROUND OF THE INVENTION

1. Field of the Invention

The present invention relates to a terminal device that performs a specific process, an apparatus and method for controlling such a terminal device, and a method of controlling a specific process in such a terminal device.

2. Prior Art

Various terminal devices are available, which people may use. In terms of use, they can be classified into communications terminals and household terminals. The communications terminals include personal computer (PC) terminals, portable terminals, cellular telephones, telephone sets, and the like. The household terminals include television receivers, stereophonic sets, set-top boxes and the like. Terminal devices of the same type can be classified in accordance with the places where they are used. For example, personal computers may be classified into office-use ones and household-use ones.

Of the terminal devices people can use, some utterly differ from in function, while the others are very similar in function. Telephone sets that enable people to talk to each other, personal computers that exchange electronic mails and personal digital assistants (PDAs), for example, are similar in function because they help people to communicate with one another. Personal data, such as the setting parameters, address pads and telephone directories, are distributed to the terminal devices. This means that any person who owns a terminal device needs to set use conditions in the terminal device and write an address pad into the terminal device. Since no consolidated management of personal data can be achieved, the user needs to spend much time and labor to set parameters in his terminal device.

BRIEF SUMMARY OF THE INVENTION

The present invention has been made in view of the above. An object of the invention is to provide a method of controlling a various types of terminal devices, making them perform their respective functions.

To achieve the object, a terminal control apparatus according to the invention is designed to control a terminal device that performs a specific process. The apparatus comprises: communication means for performing communication between the terminal device and the terminal control apparatus; and control means for controlling the terminal device, by using a terminal control function that accords with the terminal device which is communicating with the apparatus through the communication means.

According to the invention, there is provided a method of controlling a terminal device that performs a specific process. The method is designed to perform a terminal control function that accords with the terminal device that is communicating with the apparatus through the communication means.

According to this invention, there is provided a terminal device having various function units that perform specific processes under the control of a terminal control apparatus. The terminal device comprises: communication means for performing communication between the terminal device and the terminal control apparatus; and control means for transmitting terminal information to the terminal control apparatus and for causing the function units to perform the specific processes in accordance with terminal control functions the terminal control apparatus has effected in accordance with the terminal information. The terminal information represents the type and capacity of the terminal device.

According to the invention, there is provided a method of controlling a terminal device having various function units that perform specific processes under the control of a terminal control apparatus. The method comprises a step of acquiring terminal information from the terminal device and transmitting the same to the terminal control apparatus, and a step of causing the function units to perform the specific processes in accordance with terminal control functions the terminal control apparatus has effected in accordance with the terminal information, said terminal information representing the type and capacity of the terminal device.

According to the present invention, there is provided a medium storing a program for causing a terminal control apparatus to control the various function units provided in a terminal device and designed to perform specific processes.

According to the invention, there is provided a program for causing a terminal control apparatus to control the various function units provided in a terminal device and designed to perform specific processes. The program is selected by the terminal control apparatus in accordance with terminal information that represents the type and capacity of the terminal device, for imparting an input function, a communication function and a display function to the terminal device.

The terminal control apparatus according to the invention can perform operations that are appropriate for various terminal devices. Particularly, consolidated management of personal data can be accomplished in the data-storing section of the apparatus, allowing the terminal devices to use the data in common. This enables each terminal device to operate in the conditions the user desires. Hence, the user can use other person's terminal device, exactly in the same conditions as he uses his own terminal device. The user therefore need not carry his own device with him; he may use any other person's terminal device or a common-use terminal device, either available wherever he goes. The terminal device can then be a very small information terminal device that need not have a special input/output unit.

DETAILED DESCRIPTION OF THE INVENTION

Embodiments of the present invention will be described, with reference to the accompanying drawings.

Figure 1:
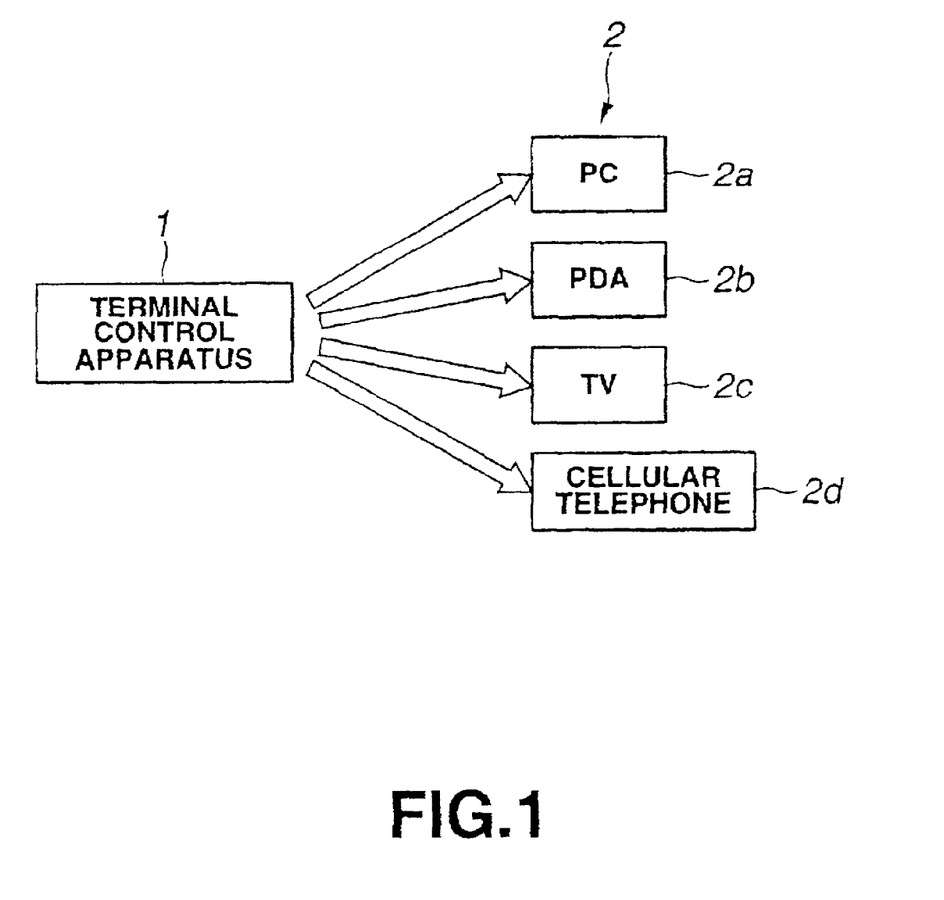
FIG. 1 is a diagram showing a terminal control apparatus according to the invention and terminal devices controlled by the terminal control apparatus.

FIG. 1 shows an embodiment of the invention, which is a combination of a terminal control apparatus 1 and a terminal device 2. The terminal device 2 may be a personal computer 2a, a personal digital assistant 2b, a television receiver 2c or a cellular telephone 2d. The apparatus 1 is inserted in the terminal device 2 to control the device 2. Hereinafter, the terminal control apparatus 1 shall be said to "be applied to the terminal device 2" when it is inserted into the device 2.

Figure 2:
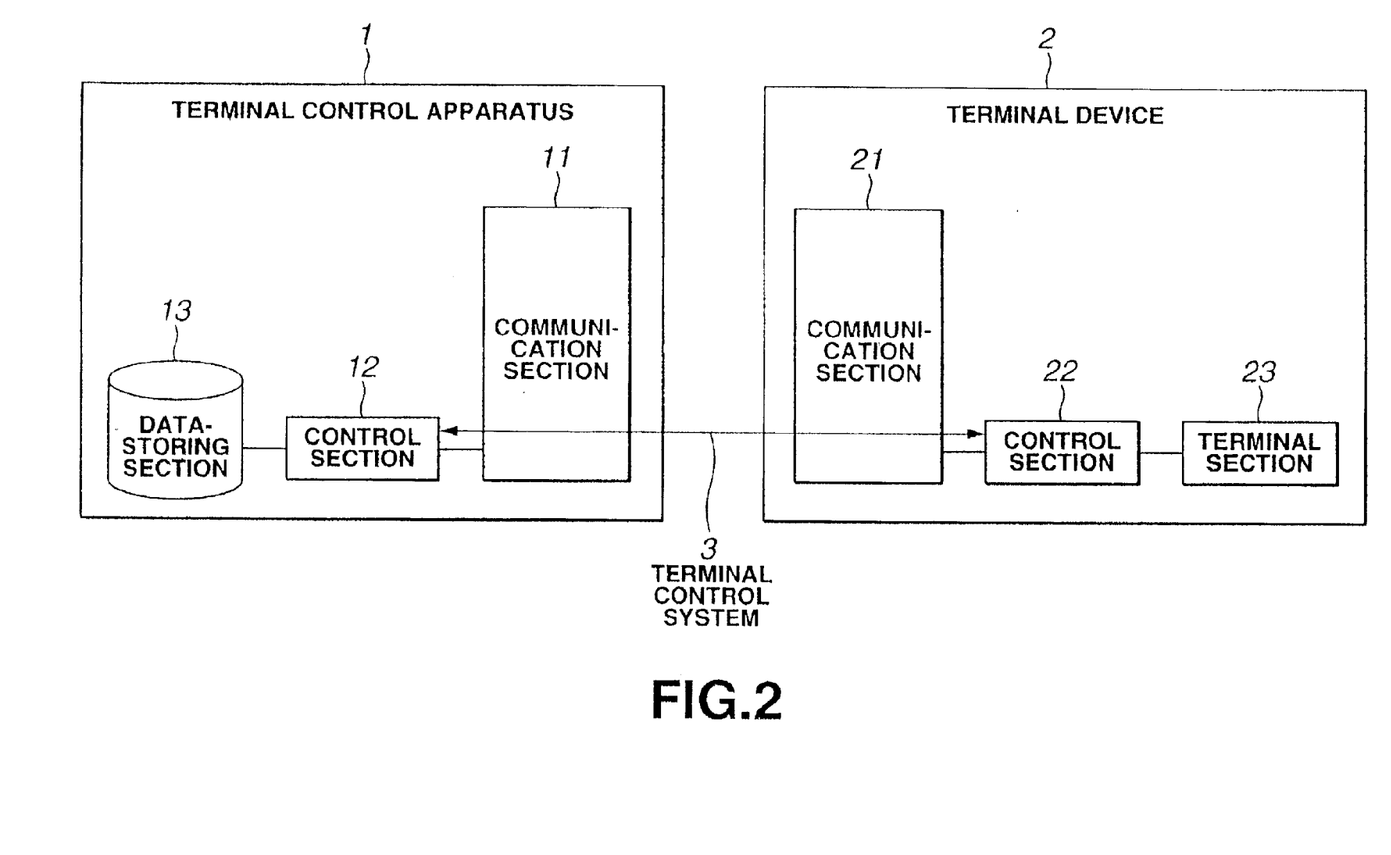
FIG. 2 is a block diagram illustrating the terminal control apparatus and one of the terminal devices.

The terminal control apparatus 1 and the terminal device 2 will be briefly described, with reference to FIG. 2. As FIG. 2 shows, the terminal control apparatus 1 comprises a communication section 11, a control section 12, and a data-storing section 13. The communication section 11 effects communication with the terminal device 2. The control section 12 controls the terminal device 2. The terminal device 2 comprises a communication section 21, a control section 22, and a terminal section 23. The communication section 21 carries out communication with the terminal control apparatus 1. The control section 22 transmits terminal information to the terminal control apparatus 1. The terminal information represents the type and capacity of the terminal device 2. In accordance with the terminal information, the terminal control apparatus 1 controls the terminal device 2. More precisely, the control section 22 controls the terminal section 23 in the terminal device 2.

The communication sections 11 and 21, which are incorporated in the terminal control apparatus 1 and the terminal device 2, respectively, are communication devices for exchanging data between them. They may be contact-type interfaces such as PCMCIA, USB or serial interfaces. Alternatively, they may be non-contact type interfaces such as IrDA or Bluetooth interfaces.

The control section 12 provided in the terminal control apparatus 1 controls the terminal device 2. The section 12 comprises a CPU, an operating system (OS), middle-ware and software. The section 12 selects one of several terminal functions in accordance with the type of the terminal device 2 to and from which data is received and transmitted through the communication section 11. The section 12 performs the function thus selected, thereby to control the terminal device 2.

Figure 3:
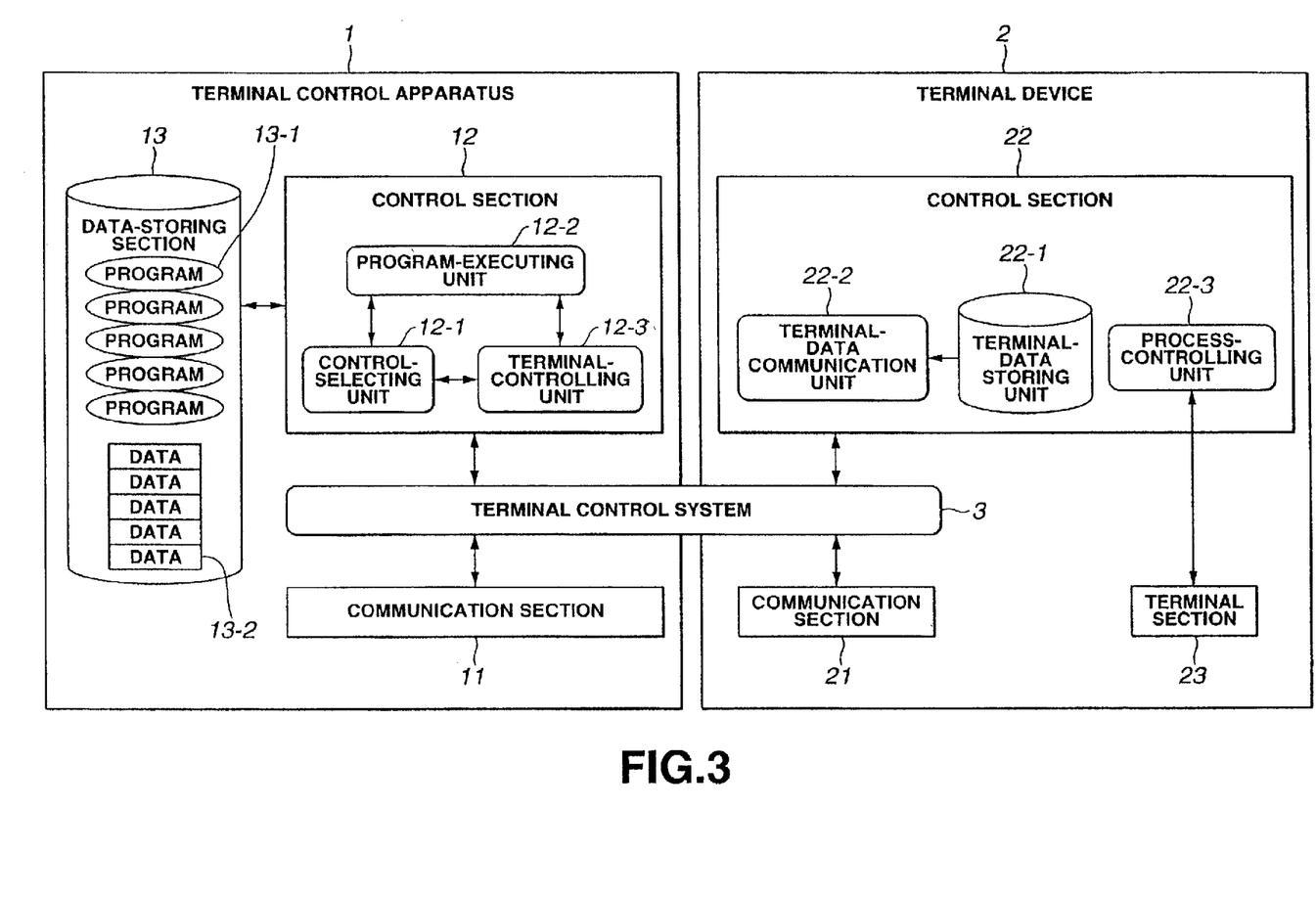
FIG. 3 is a block diagram showing, in more detail, the terminal control apparatus and the terminal device, both schematically illustrated in FIG. 2.

As shown in FIG. 3, the control section 12 comprises a control-selecting unit 12-1, a program-executing unit 12-2, and a terminal-controlling unit 12-3. The control-selecting unit 12-1 selects an application program in accordance with the terminal information transmitted from the terminal device 2. The unit 12-1 then acquires the application program from the data-storing section 13, which will be described later. The application program, thus selected and acquired, will be used to control the terminal device 2. The program-executing unit 12-2 executes the application program selected by the control-selecting unit 12-1, causing the terminal-controlling unit 12-3 to control various functions the terminal device 2 performs, such as inputting of data and displaying of data.

The data-storing section 13 stores application programs 13-1 and data items 13-2. The application programs 13-1 are use to control various types of terminal devices. The data items 13-2 are required in order to control the terminal devices. The data-storing section 13 is a memory device in which data remains stored even if no electric power is supplied to it.

The control section 22 provided in the terminal device 2 performs a method of controlling a specific process, according to the present invention. To state more precisely, the section 22 transmits terminal information to the terminal control apparatus 1, said terminal information representing the type and capacity of the terminal device 2. The terminal control apparatus 1 executes an application program in accordance with the terminal information. Then, the control section 22 causes the terminal section 23 to carry out a terminal function that accords with the application program. Thus, the control section 22 controls the terminal section 23, while effecting a prescribed process jointly with the terminal control apparatus 1. The control section 22 comprises a CPU, a microcomputer an operating system (OS) and software. As shown in FIG. 3, the control section 22 further comprises a terminal-data storing unit 22-1, a terminal-data communication unit 22-2, and a process-controlling unit 22-3. The terminal-data storing unit 22-1 stores the terminal information showing the type and capacity of the terminal device 2. The terminal-data communication unit 22-2 transmits and receives the terminal information to and from the terminal control apparatus 1. The process-controlling unit 22-3 performs a prescribed process, together with the terminal control apparatus 1, and controls the terminal section 23 in accordance with an instruction supplied from the terminal control apparatus 1.

The terminal section 23 comprises hardware and software, such as an I/O device and driver that are controlled by the control section 22, which in turn is controlled by the control section 12 of the terminal control apparatus 1. The terminal section 23 provides various functions, such as display function, input function (e.g., keyboard, ten-key pad and mouse), network connection (e.g., LAN connection and line connection), audio input function (e.g., microphone and speaker), image input function (e.g., CCD), and connection function (e.g., connection with the other terminal devices).

The operating sequence of the terminal control system 3, which servers as interface between the terminal control apparatus 1 and the terminal device 2, will be described. The terminal control system 3 is provided between the terminal control apparatus 1 and the terminal device 2, not defining a physical interface. It is an open interface that accords with an open-interface protocol control function.

Figure 4:
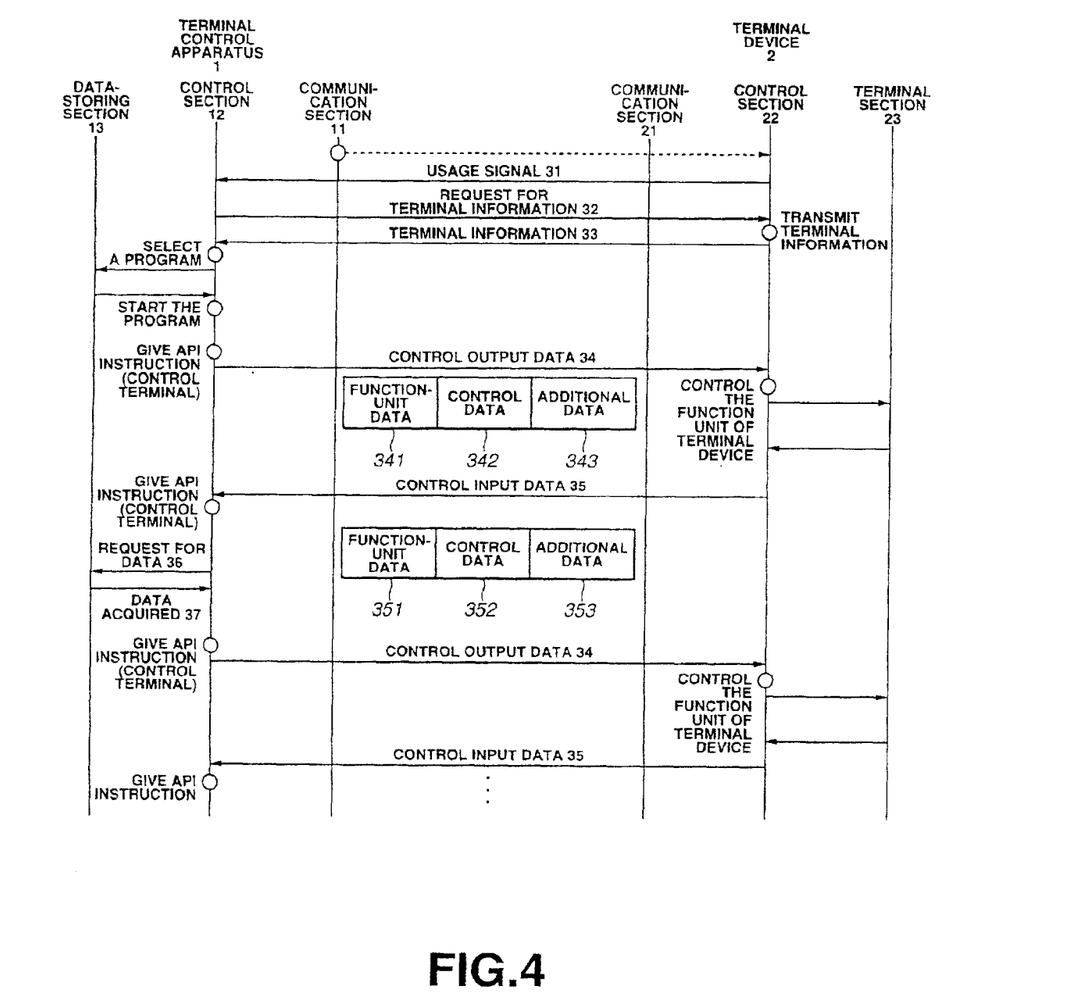
FIG. 4 is a chart explaining the control sequence the terminal control apparatus performs to control the terminal device.

FIG. 4 is a chart that explains how the terminal control system 3 works as interface between the terminal control apparatus 1 and the terminal device 2. When the terminal control apparatus 1 is used to control the terminal device 2, this is detected in the terminal device 2. The terminal device 2 transmits a usage signal 31 to the terminal control apparatus 1. The function of detecting the use of the terminal control apparatus 1 may be provided anywhere in the terminal device 2, so long as the usage signal 31 is reliably transmitted to the terminal control apparatus 1. In the terminal control apparatus 1 the control section 12 receives the usage signal 31. The control section 12 uses the signal 31 as a trigger and transmits a request for terminal information, to the terminal device 2. In the terminal device 2, the control section 22 receives the request, acquires the terminal information 33 form the terminal-data storing unit 22-1 and transmits the terminal information 33 to the terminal control apparatus 1.

Figure 5:
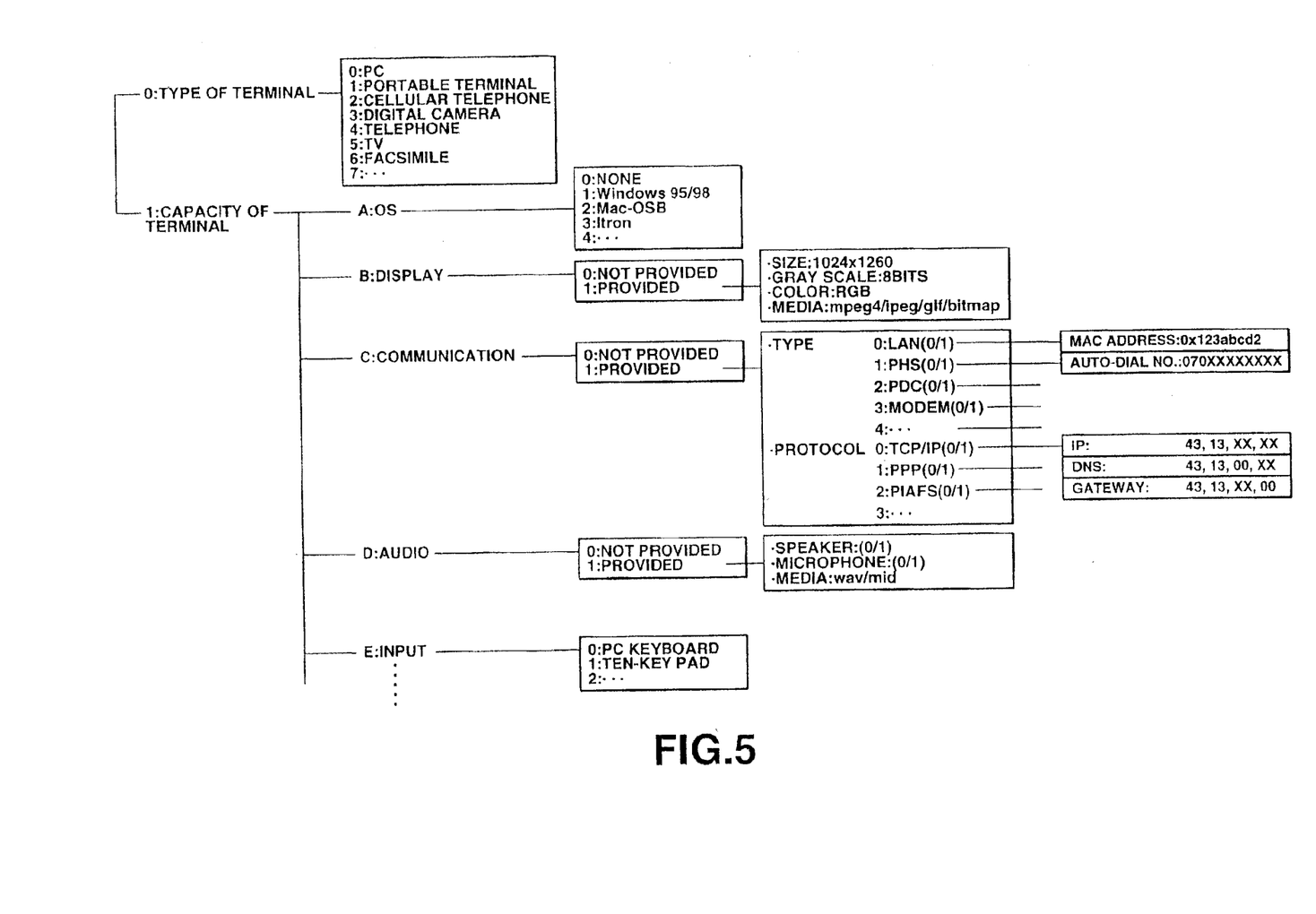
FIG. 5 is a diagram showing terminal information that represents the types of terminal devices and the capacities thereof.

The terminal information 33 represents type and capacity of the terminal device 2, as is illustrated in FIG. 5. The type and capacity of the terminal device 2 are indicated by "0" and "1," respectively. The type of terminal device may be a PC ("0"), a portable terminal ("1"), a cellular telephone ("2"), a digital camera ("3"), a telephone ("4"), a television receiver ("5"), a facsimile machine ("6"), or the like. The capacity of terminal device is categorized as OS ("A"), display ("B"), communication ("C"), audio ("D"), input ("E") and the like. Each categorized item is described is encoded, describing the data medium and communication setting data which may be applied to the item. In the case of display capacity B, for example, the code "0" means that no display is provided, and the code "1" means that a display is provided.

As is shown in FIG. 4, the control section 12 of the terminal control apparatus 1 receives the terminal information 33 transmitted from the terminal device 2. The control section 12 analyzes the terminal information 33 and selects one of the application programs stored in the data-storing section 13, which is appropriate for the terminal device 2.

The control section 12 executes the application program thus selected and acquired from the data-storing section 13. The application program is, for example, a communication program for accomplishing electronic mail or talking. The application is used to control the terminal device 2, by giving API commands via an application-program interface (API) that is utilized in common in all terminal devices. Specific examples of the APIs are an API that connects the terminal device to a network, an API that connects the terminal device to a server, an API that verifies the terminal device, an API that transmits data, an API that receives data, and an API that receives mails.

The control section 12 of the terminal control apparatus 1 cooperates with control section 22 of the terminal device 2, executing the application program mentioned above. More specifically, the control-selecting unit 12-1 selects and acquires an application program from the data-storing section 13 in accordance with the terminal information transmitted from the terminal device 2. The program-executing unit 12-2 executes the application program, thus selected and acquired, to control the terminal device 2. As the application program is executed, the terminal-controlling unit 12-3 controls the function of the terminal device 2, such as the inputting of data or the displaying of data.

Data is exchanged between the control section 12 of the terminal control apparatus 1 and the control section 22 of the terminal device 2 through the terminal control system 3, in accordance with the protocol (open interface protocol) that does not depend on the type of the terminal device 2. The terminal control apparatus 1 transmits control output data 34 to the terminal device 2. The control output data 34, which is defined by the open interface protocol, is used to control one of the functions that the terminal section 23 performs in the terminal device 2. The data 34 is composed of function-unit data 341, control data 342 and additional data 343. The data 341 represents the type of the terminal section 23. The data 342 indicates the type of control. The data 343 is necessary for controlling the function the terminal section 23 carries out.

In the terminal device 2, the control section 22 receives the control output data 34. The control section 22 performs the control that the additional data has designated for the terminal section 23. The result of this control is transmitted to the control section 12 of the terminal control apparatus 1, in the form of control input data 35 that is defined by the open interface protocol. Like the control output data 34, the control input data 35 is composed of function-unit data 351, control data 352 and additional data 353. The control input data 35 is not always used as a response to the control output data 34. Rather, it may be transmitted as a control request from the terminal device 2 to the terminal control apparatus 1. In this case, the control output data 34 is the response to the control input data 35.

The control section 12 of the terminal control apparatus 1 not only controls the execution of application programs and the terminal section 23 of the terminal device 2. The control section 12 also acquires the data stored in the data-storing section 13. More precisely, the section 12 transmits a data request 36 to the data-storing section 13 and acquires data 37 from the data-storing section 13.

Thus, the control section 12 effects a control sequence, by transmitting the control output data 34 to the terminal device 2, receiving the control input data 35 from the terminal device 2, and acquiring data from the data-storing section 13.

Figure 6:
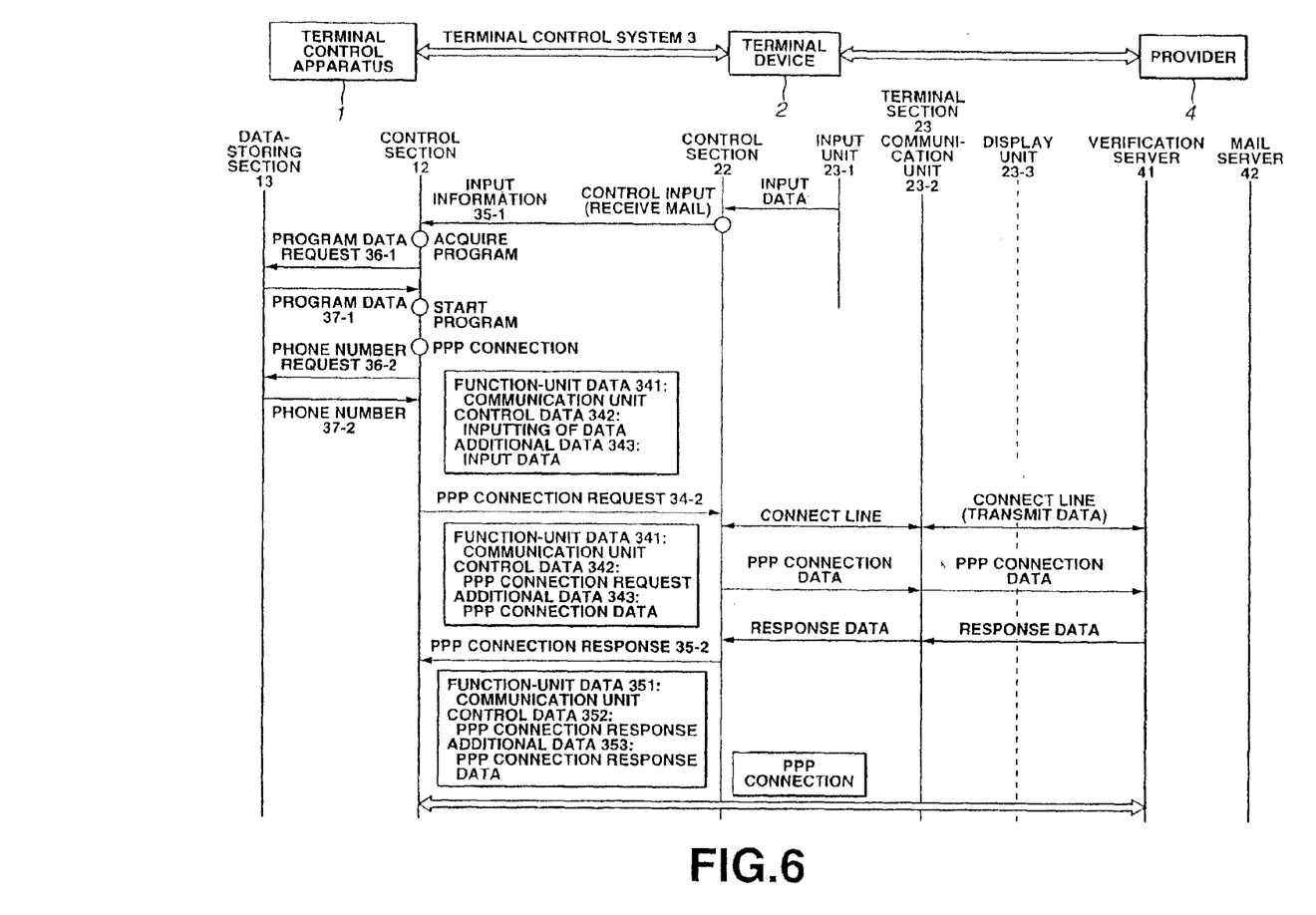
FIG. 6 is a chart illustrating a first control sequence that is effected to cause the control sections of the terminal control apparatus and the terminal device to execute application programs.
Figure 7:
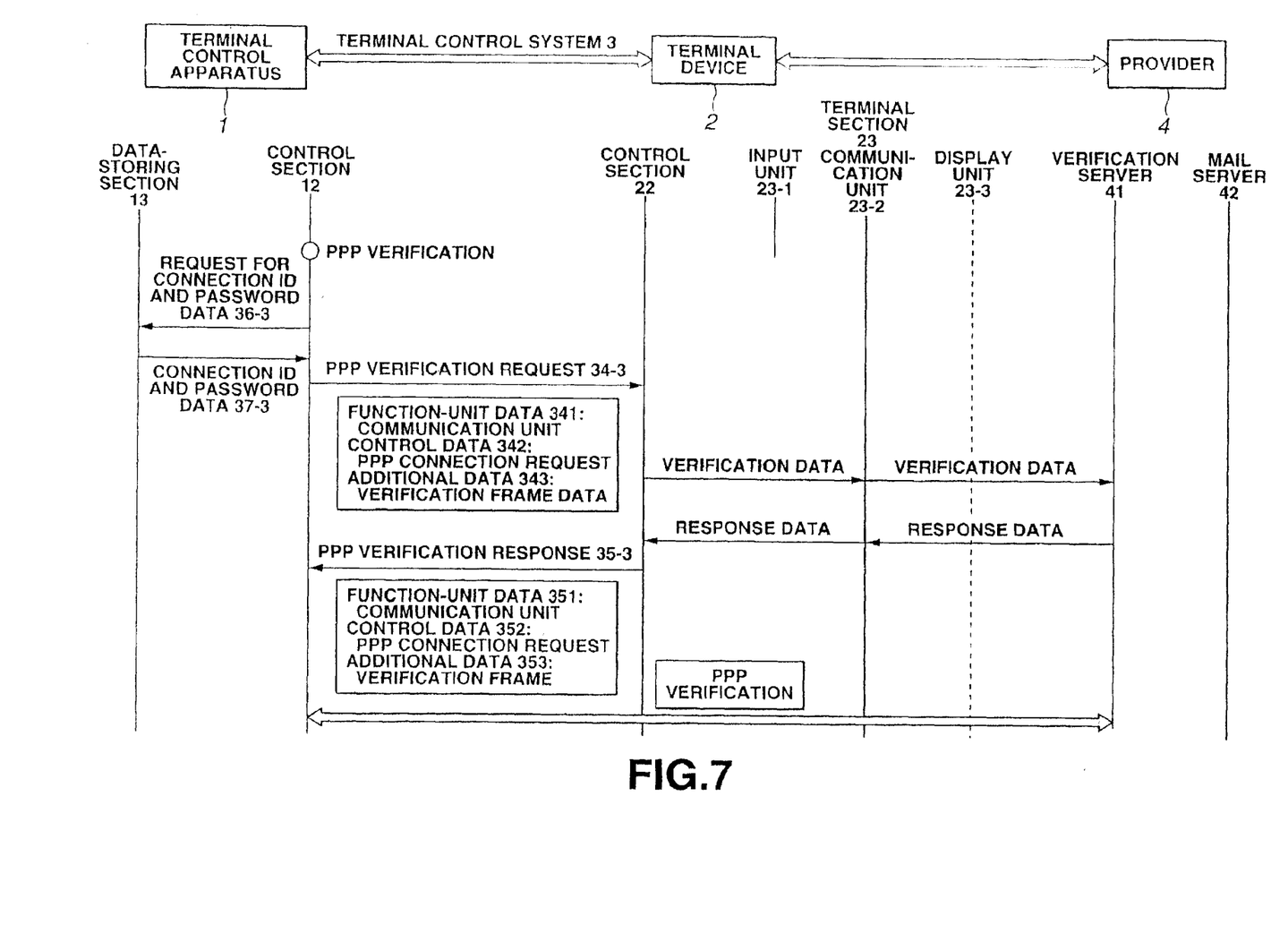
FIG. 7 is a chart illustrating a second control sequence that is effected to cause the control sections of the terminal control apparatus and the terminal device to execute application programs.
Figure 8:
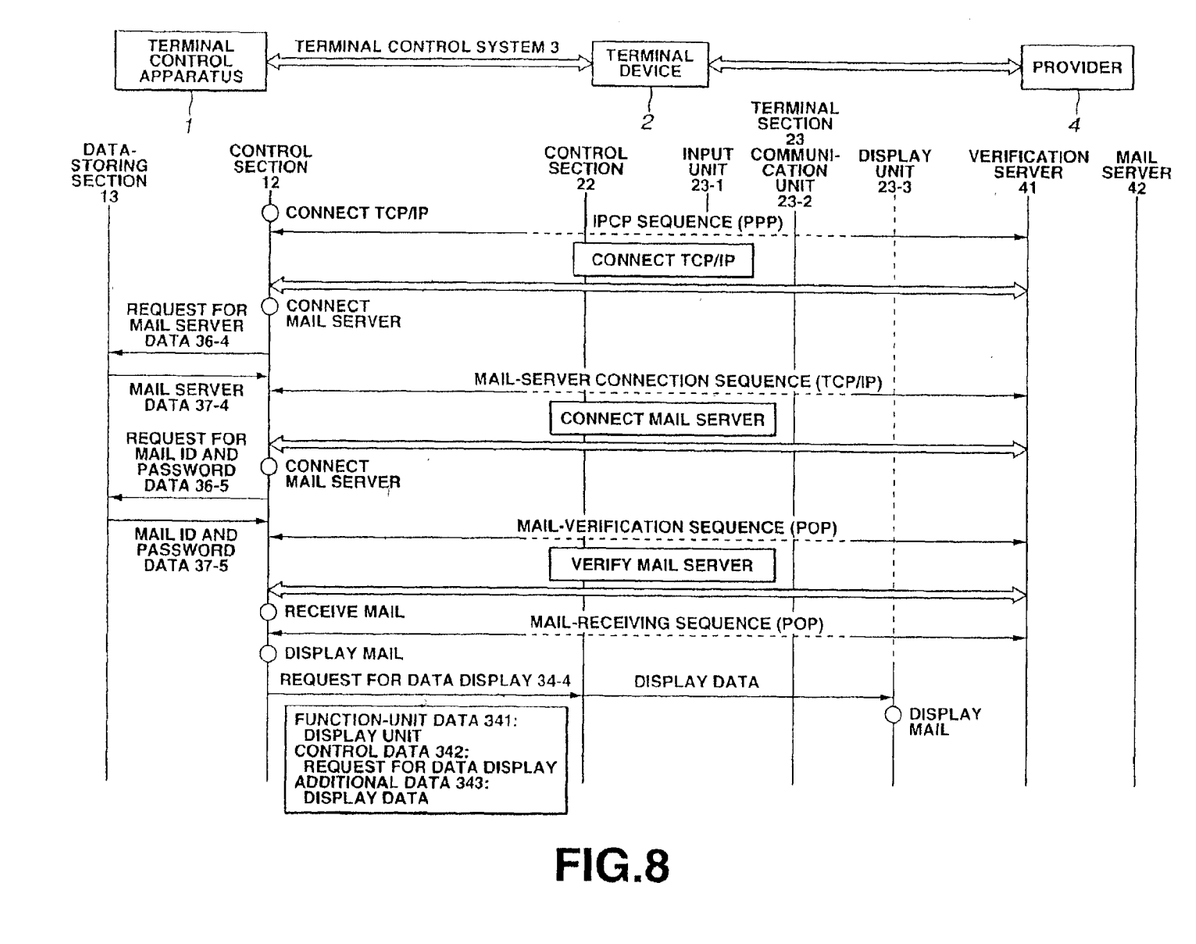
FIG. 8 is a chart illustrating a third control sequence that is effected to cause the control sections of the terminal control apparatus and the terminal device to execute application programs.

The control sequence of executing the application program in the control section 12 of the terminal control apparatus 1 and in the control section 22 of the terminal device 2 will be described in detail, with reference to FIGS. 6 to 8. FIGS. 6, 7 and 8 illustrate various control sequences that the terminal control apparatus 1 may perform on a PHS (i.e., the terminal device 2). Note that the PHS has PIAFS (PHS Internet Access Forum Standard) data communication function and which can be connected to a provider 4 to receive mails as the terminal control apparatus 1 executes a mail-receipt application program.

Assume that the data-storing section 13 stores the data items 13-2 (FIG. 3) the PHS needs to have in order to receive mails from the provider 4. The data items are telephone number data, connection ID, password data, mail server data, mail ID and password data. The telephone number data is used to connect a verification server 41 and a PPP (Point to Point Protocol). The connection ID and first-mentioned password data are checked against the data in the verification server 41 checks in order to verify the PHS. The mail server data is used to connect the PHS to the mail server 42 of the provider 4. The mail ID and the second-mentioned password data are checked against the data in the mail server 42 to verify the PHS.

As shown in FIG. 6, the terminal device 2, or PHS, comprises an input unit 23-1, a communication unit 23-2, and a display unit 23-3. The input unit 23-1 has keys, which are operated to input data. The communication unit 23-2 connects the terminal device 2 via a line to any other communication device desired, enabling data communication according to PIAFS. The display unit 23-3 causes a display to display data.

The control section 12 of the terminal control apparatus 1 executes the mail-receipt application program. That is, in the control section 12, the program-executing unit 12-2 and terminal-controlling unit 12-3 cooperate, controlling the input unit 23-1, communication unit 23-2 and display unit 23-3 of the terminal device 2 (i.e., PHS). The control section 12 has an OS, middle-ware, API and the like to execute the application program. The conditions in which the control section 12 executes the application program will be explained later.

In the terminal device 2, the control section 22 controls the terminal section 23 in accordance with the data supplied via the terminal control system 3. This means that the operation of the control section 22 depends on the function of the terminal device 2 and the conditions in which the device 2 operates.

At first the control section 12 waits for data that may be input at the input unit 23-1. When the user input data at the input unit 23-1, the control section 22 of the terminal device 2 transmits input information 35-1, or the control input data 35, to the control section 12 of the terminal control apparatus 1. The input information 35-1 contains function-unit data 341 that designates the input unit, control data 342 that indicates the inputting of data and additional data 343 that shows the content of the input data.

In the terminal control apparatus 1, the control section 12 analyzes the input information 35-1 it has received. If the input information 35-1 is found to be one for starting the application program designed to receive mails, the control section 12 acquires the application program from the data-storing section 13. Further, the section 12 renders the application program available for use. Thus the application program performs the sequence of receiving mails, as will be explained below.

First, the application program designed to receive mails is stored into the verification server 41, by means of PPP connection. More precisely, the control section 12 transmits a telephone number request 36-2 to the data-storing section 13, thereby obtaining the telephone number 37-2. The control section 12 then transmits a PPP connection request 34-2, or control output data 34, to the control section 22 of the terminal device 2. The PPP connection request 34-2 contains function-unit data 341 that designates the communication unit, control data 342 that is a PPP connection request and additional data 343 that is PPP connection data. When the control section 22 receives the PPP connection request 34-2, the section 22 causes the communication unit 23-2 to accomplish line connection control. If the line connection control make data communication possible, the section 22 supplies the PPP connection data (i.e., additional data 343) to the communication path now available. Upon receipt of the PPP connection data, the verification server 41 supplies response data about the PPP connection, to the communication path. Upon receipt of the response data, the communication unit 23-2 transmits the response data to the control section 22. The control section 22 transmits a PPP connection response 35-2, or terminal control input data. The PPP connection response 35-2 contains function-unit data 351 that designates the communication unit, control data 352 that is a PPP connection response and additional data 353 that is PPP connection response data. The control section 12, which executes the application program designed to receive a mail, analyzes the PPP response data, thereby determining whether or not the PPP connection has been successfully accomplished.

If the PPP connection has been successfully accomplished, the application program will be executed to carry out PPP verification. FIG. 7 illustrates the control sequence of the PPP verification. First, the connection ID and password data are fetched from the data-storing section 13, as in the case of accomplishing the PPP connection. Next, PPP verification frame data is generated and transmitted to the control section 22 in response to a PPP verification request 34-3. The control section 22 transmits the PPP verification data to the communication unit 23-2 though the communication path. The section 22 generates a PPP verification response from the response data it has received via the communication unit 23-2. The PPP verification response 35-3 is transmitted to the control section 12. The control section 12 analyzes the response 35-3 (i.e., the response data), determining whether the PPP verification has been achieved successfully.

If the PPP verification has been achieved successfully, the sequence control is performed by the control section 12, control section 22 and communication unit 23-2, as is illustrated in FIG. 8. Thereby, TCP/IP connection is controlled, the connection with the mail server 42 is controlled, the verification of the server 42 is controlled, and the mail acquisition from the server 42 is controlled.

The control section 12 acquires a mail and generates display data the display unit 23-3 can display. As shown in FIG. 8, the section 12 transmits the data, as request 34-4 for data display, to the control section 22. The control section 22 transmits display data to the display unit 23-3. As a result, the display unit 23-3 displays the mail the control section 12 has acquired.

As described above, the terminal device 2 does not have PPP function, TCP/IP function or mail client function. Nevertheless, since the control section 12 of the terminal control apparatus 1 has a PPP protocol stack and a TCP/IP protocol stack, the section 12 can works as a mail client in the terminal device 2. Further, the terminal control apparatus 1 can control various types of terminal devices, thanks to the use of the terminal control system 3. This is because the system 3, which is provided between the control section 12 of the terminal control apparatus 1 and the control section 22 of the terminal device 2, can control whichever type of a terminal device.

Methods of selecting an application program for use in the terminal device 2 controlled by the terminal control apparatus 1 will be described, with reference to FIGS. 9 and 10. It will be also described how the control section 12 executes the application program selected.

It will be first explained how an application program is selected in accordance with the terminal type data contained in the terminal information. The terminal control apparatus 1 controls a plurality of terminal devices 2. The data-storing section 13 provided in the apparatus 1 stores application programs that each terminal device 2 can control. The control section 22 of the terminal device 2 has a section that stores terminal information 33 representing the type of the terminal device 2. Moreover, the control section 12 of the terminal control apparatus 1 has a control-selecting unit 12-1 that selects an application program in accordance with the type of the terminal device 2, which is represented by the terminal information 33.

The control section 12 acquires the terminal information 33 from the terminal device 2 and determines the type of the terminal device 2 from the information 33. In accordance with the type of the device 2, thus determined, the control-selecting unit 12-1 selects an application program the terminal device 2 can execute. Then, the control section 12 of the terminal device 2 activates the application program selected for the terminal device 2.

Figure 9:
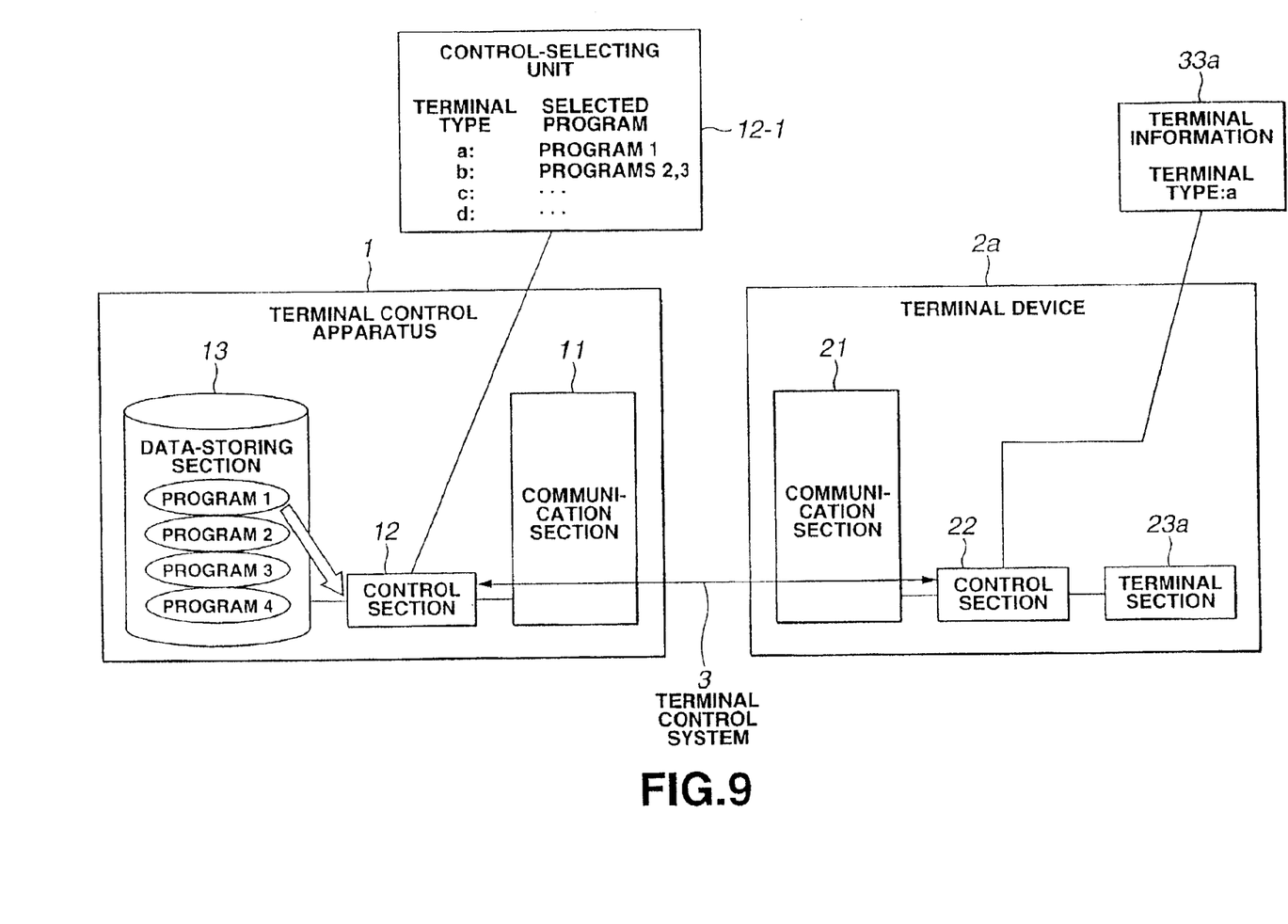
FIG. 9 is a diagram explaining a first method of selecting an application program for use in a terminal device that is controlled by the terminal control apparatus.

In the embodiment shown in FIG. 9, the control section 12 of the terminal control apparatus 1 receives the terminal information 33a from the terminal device 2a. From the information 33a the section 12 determines that the terminal device 2a is of type a. The control-selecting unit 12-1 selects application program 1 that the terminal device 2a can execute.

Figure 10:
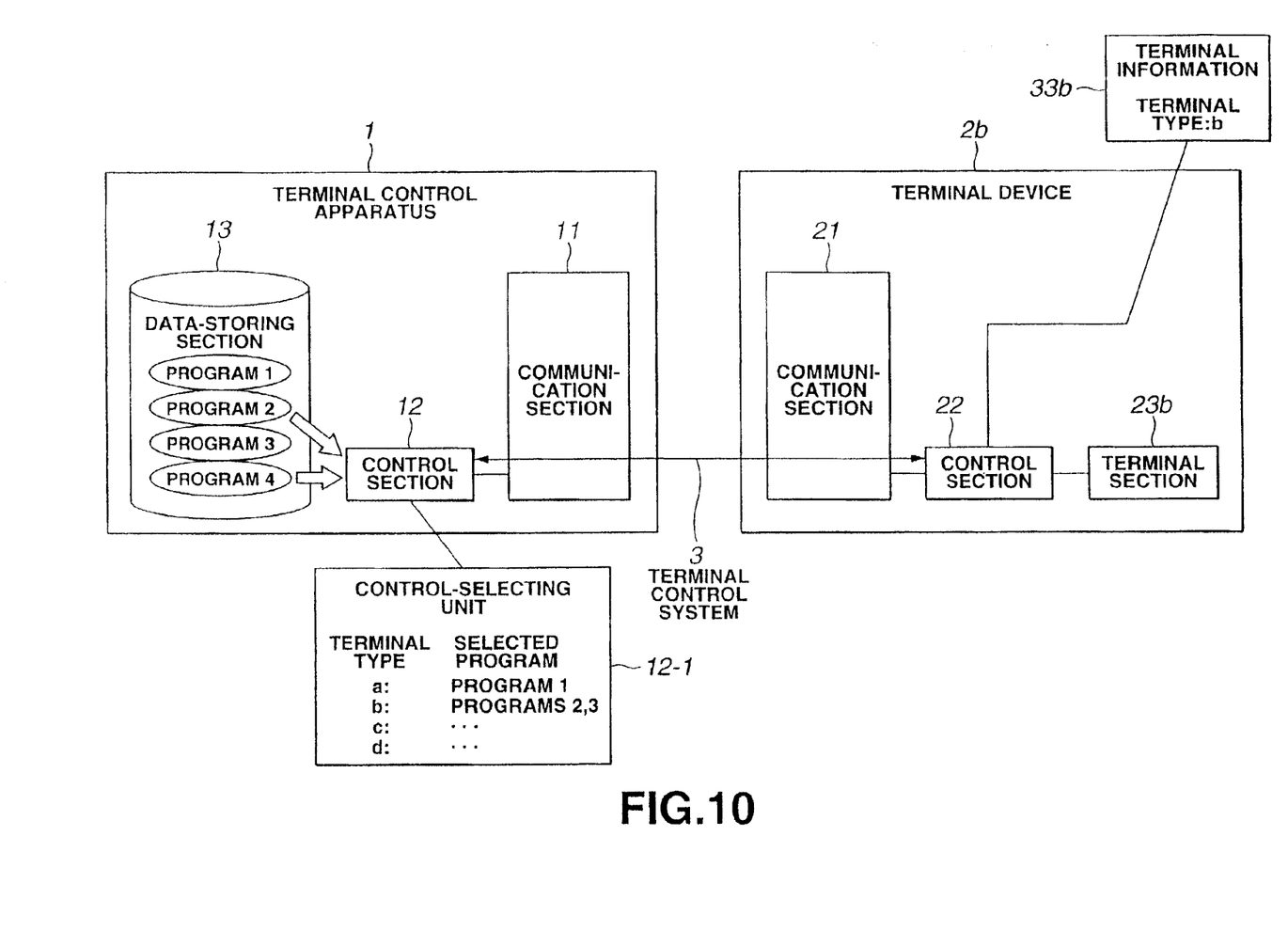
FIG. 10 is a diagram explaining a second method of selecting an application program for use in a terminal device that is controlled by the terminal control apparatus.

In the embodiment shown in FIG. 10, the control section 12 of the terminal control apparatus 1 receives the terminal information 33b from the terminal device 2b. From the information 33b the section 12 determines that the terminal device 2b is of type b. The control-selecting unit 12-1 selects application programs 2 and 3 that the terminal device 2b can execute.

The control section 12 controls the terminal devices 2a and 2b in spite of the difference as may be seen from FIG. 5 in type between the devices 2a and 2b and the difference in type between the terminal sections 23a and 23b provided in the devices 2a and 2b, respectively. How the section 12 controls the devices 2a and 2b will be described with reference to FIGS. 11 and 12. More specifically, the control-selecting unit 12-1 selects an application program that is most suitable for the type described in the information 33 about the terminal device 2. The program-executing unit 12-2 executes the application program, thus selected, thereby controlling to control the terminal device 2. That is, the terminal section 23 of the device 2 is controlled in accordance with the application program the unit 12-2 executes.

The data-storing section 13 provided in the apparatus 1 stores application programs A to E. The programs A to E can be used by the terminal devices 2a and 2b in common. The best possible controls the terminal sections 23a and 23b of the devices 2a and 2b perform are to determine the capacities of the devices 2a and 2b and select the devices 2a and 2b.

Each terminal device may have various capacities as may be seen from FIG. 5. It may have various communication capacities, such as line control, LAN connection capacity, a TCP/IP protocol stack and the like. Further, it may have various display capacities, such as gray scale, image size and the like. Usually, the gray scale, image size and the like differ in accordance with the type of the terminal device.

Figure 11:
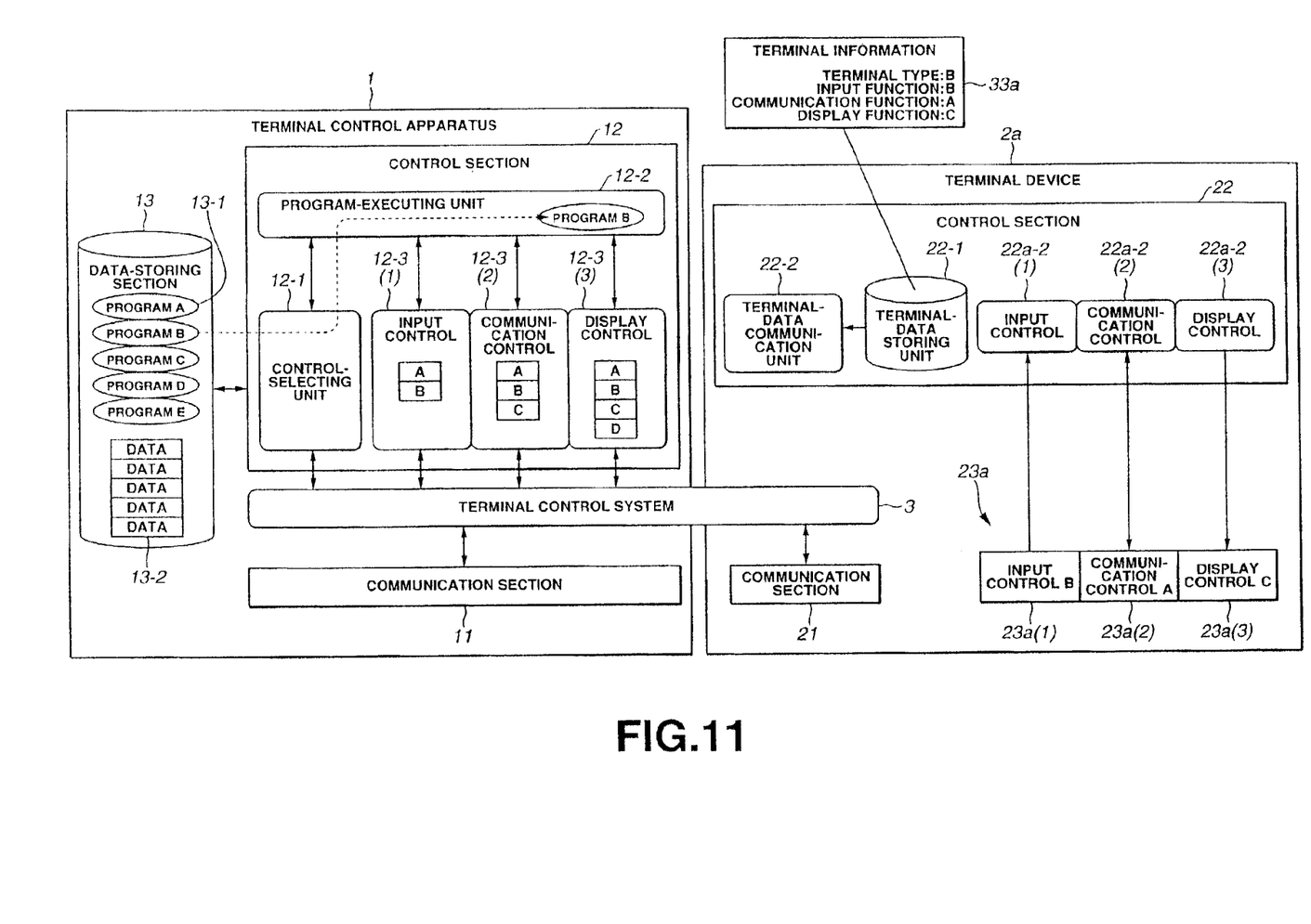
FIG. 11 is a diagram explaining a first method the terminal control apparatus performs to control the process in a terminal device by executing an application program.
Figure 12:
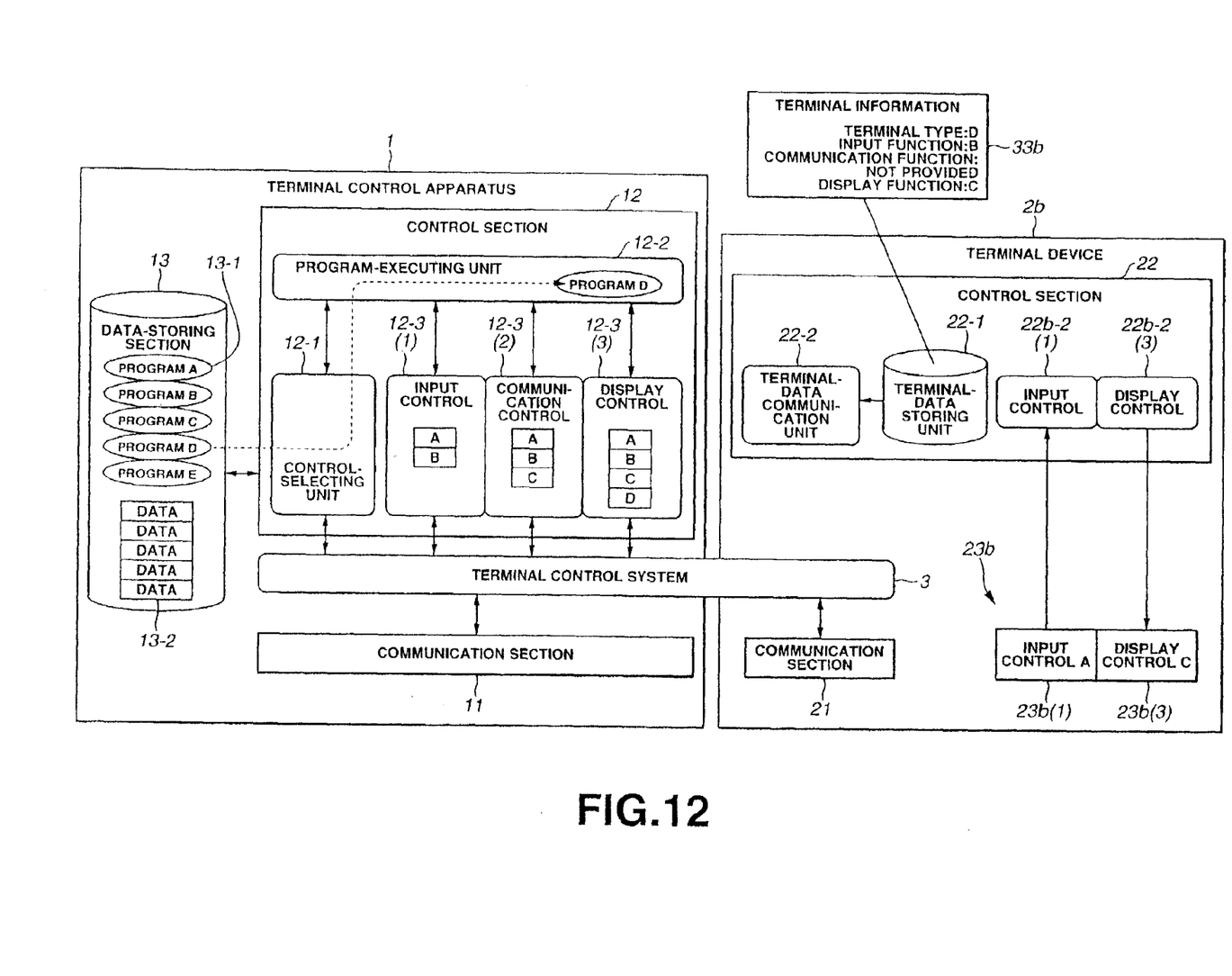
FIG. 12 is a diagram explaining a second method the terminal control apparatus performs to control the process in a terminal device by executing an application program.

In the embodiments shown in FIGS. 11 and 12, the programs for controlling the terminal sections 23a and 23b are stored in the process-controlling unit 12-3 that is provided in the control section 12 of the terminal control apparatus 1. (In the embodiment of FIG. 11, the terminal section 23a comprises an input unit 23a(1), a communication unit 23a(2) and a display unit 23a(3); in the embodiment of FIG. 12, the terminal section 23b comprises an input unit 23b(1) and a display unit 23b(3).) In each embodiment, process-control programs are provided in the same number as the control units incorporated in the terminal section.

For example, as shown in FIGS. 11 and 12, the input control unit 12-3(1) has two process-control programs A and B, the communication control unit 12-3(2) has three process-control programs A, B and C, and the display control unit 12-3(3) has four programs A, B, C and D. The control section 22 of the terminal devices 2 has control units for controlling the terminal section 23. In the embodiment of FIG. 11, the control section 22 has an input control unit 22a-2(1), a communication control unit 22a-2(2), and a display control unit 22a-2(3). In the embodiment of FIG. 12, the control section 22 has an input control unit 22b-2(1) and a display control unit 22b-2(3). Which control unit should be used to control which function unit is described in the terminal information 33. In the case of embodiment in FIG. 11, the functions A, B and C are described in the terminal information 33a. Thus, a communication unit, an input unit and a display unit must be operated. Therefore, the control section 12 of the terminal control apparatus 1 acquires the terminal information 33a from the terminal device 2a and selects the programs for operating the function units defining the terminal capacity, i.e., input unit 23a(1), communication unit 23a(2) and display unit 23a(3). In the embodiment in FIG. 12, the functions A and B are described in, and function C is not described in the terminal information 33b. Hence, an input unit and a display unit must be operated. Therefore, the control section 12 of the terminal control apparatus 1 acquires the terminal information 33b from the terminal device 2b and selects the programs for operating the function units defining the terminal capacity, i.e., input unit 23b(1) and display unit 23b(3).

What is claimed is:

1. A terminal control apparatus controlling a terminal device, comprising:

communication means for communicating with the terminal device and for receiving terminal device information from the terminal device;

storage means for storing plural programs;

control means for controlling selection of a program from the storage means in response to the terminal device information received by the communication means from the terminal device, the program selected being configured to control functions of the terminal device, the control means further processing the program selected and communicating with the terminal device through the communication means for controlling the terminal device to perform terminal device functions in accordance with the program selected.

2. The terminal control apparatus according to claim 1, wherein the control means selects different programs for controlling different types of terminal devices as indicated by the terminal device information received from each different type of terminal device.

3. The terminal control apparatus according to claim 2, wherein the control means comprises selection means for selecting the program indicated by the terminal device information, the terminal device information including information indicating terminal device type and terminal device capabilities.

4. The terminal control apparatus according to claim 3, wherein the control means further includes function control means for controlling various function units of the terminal device, and the function control means controls the functions corresponding to the various function units in accordance with the program selected.

5. The terminal control apparatus according to claim 1, wherein information is received from and transmitted to the terminal device through the communication means that operates regardless of what type of terminal device is present.

6. A terminal control apparatus controlling a terminal device, comprising:

data storage means for storing terminal device programs and personal user data peculiar to a user;

communication means for communicating with the terminal device, for receiving terminal device information from the terminal device, and for transmitting the personal user data from the terminal control apparatus to the terminal device; and control means for selecting one of the programs stored in a data storage device in response to the terminal device information received by the communication means and the personal user data, and for executing the program selected by the control means, wherein the program selected by the control means corresponds in functions performed to a terminal device program carried by the terminal device.

7. The terminal control apparatus according to claim 6, wherein the control means selects different programs for controlling different types of terminal devices as indicated by the terminal device information received from each different type of terminal device.

8. The terminal control apparatus according to claim 7, wherein the control means comprises selection means for selecting the program indicated by the terminal device information, the terminal device information including information indicating terminal device type and terminal device capabilities.

9. The terminal control apparatus according to claim 8, wherein the control means further includes function control means for controlling various function units of the terminal device, and the function control means controls the functions corresponding to the various function units in accordance with the program selected.

10. The terminal control apparatus according to claim 6, wherein information is received from and transmitted to the terminal device through the communication means that operates regardless of what type of terminal device is present.

11. A terminal control apparatus controlling a terminal device independently usable by different users, comprising:

communication means for communicating with the terminal device;

control means for selecting a terminal control apparatus program for controlling the terminal device to operate as if being controlled by a terminal device program resident in the terminal device, said control means including, means executing the terminal control apparatus program selected by the control means, means for providing user personal data different for each different user, and means for controlling the transmission by the communication means to the terminal device of function control signals from the means for executing and user personal data from the means for providing, the terminal device being controlled by the transmitted control signals to perform corresponding functions, at least one of the functions being performed requiring the user personal data to enable performance thereof.

12. The terminal control apparatus according to claim 11, wherein information is received from and transmitted to the terminal device through the communication means that operates regardless of what type of terminal device is present.

13. The terminal control apparatus according to claim 11, wherein the personal data different for each different user includes password data.

14. The terminal control apparatus according to claim 11, wherein the personal data different for each different user includes telephone number data.

15. The terminal control apparatus according to claim 11, wherein the personal data different for each different user includes data necessary for the terminal device to connect to an e-mail provider and to receive e-mail for each different user from the e-mail provider.

16. The terminal control apparatus according to claim 15, wherein the data necessary for the terminal device to connect to an e-mail provider and to receive e-mail for each different user from the e-mail provider includes telephone number data, connection ID, password data, mail server data, and mail ID.

* * * * *